United States Patent
Wei

(10) Patent No.: US 10,054,756 B2
(45) Date of Patent: Aug. 21, 2018

(54) LENS MODULE

(71) Applicant: Chuandong Wei, Shenzhen (CN)

(72) Inventor: Chuandong Wei, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 15 days.

(21) Appl. No.: 15/355,094

(22) Filed: Nov. 18, 2016

(65) Prior Publication Data

US 2018/0017753 A1     Jan. 18, 2018

(30) Foreign Application Priority Data

Jul. 15, 2016 (CN) ............. 2016 2 0748733 U

(51) Int. Cl.
*G02B 7/02* (2006.01)

(52) U.S. Cl.
CPC ............ *G02B 7/021* (2013.01); *G02B 7/022* (2013.01); *G02B 7/025* (2013.01); *H05K 999/99* (2013.01)

(58) Field of Classification Search
CPC ......... G02B 7/021; G02B 7/022; G02B 7/003
USPC .......................... 359/819, 793–795, 811, 709
See application file for complete search history.

(56) References Cited

U.S. PATENT DOCUMENTS

| 2014/0204481 A1* | 7/2014 | Chang | G02B 7/022 359/793 |
| 2016/0161699 A1* | 6/2016 | Kim | G02B 7/021 359/784 |

\* cited by examiner

*Primary Examiner* — Darryl J Collins
*Assistant Examiner* — Kristina Deherrera
(74) *Attorney, Agent, or Firm* — Na Xu; IPro, PLLC

(57) ABSTRACT

A lens module includes a lens barrel and a lens group accommodated in the lens barrel. The lens group includes a first lens and a second lens, each of the first lens and the second lens including an arc part and a peripheral part around the arc part. A matching structure is formed by the peripheral part of the second lens and the peripheral part of the first lens. By virtue of the matching structure, the lens module of the present disclosure has a high concentricity.

10 Claims, 3 Drawing Sheets

LENS MODULE

FIELD OF THE INVENTION

The present disclosure relates to a lens module with a bonding structure.

DESCRIPTION OF RELATED ART

With progressive development of technology, electronic devices are developed constantly toward intelligent types. In addition to digital camera, portable electronic devices such as iPad, mobile phone and so on are also equipped with lens module to meet the higher requirements of people on the imaging quality of lens module, higher requirements on the reliability of the products. The reliability of the camera module to a great extent is associated with the stability of the bonding structure of the lens module.

The lens module related to the invention comprises a lens barrel having an optical aperture and a lens group arranged in the lens barrel. The lens group comprises at least two optical lenses. Connections between all optical lenses shall be stable highly; however, it is difficult to ensure the high coaxiality and stability during production and fabrication because eccentricity among the optical lenses is sensitive to optical performance.

Therefore, it is necessary to provide an improved lens module to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

Figure 1:
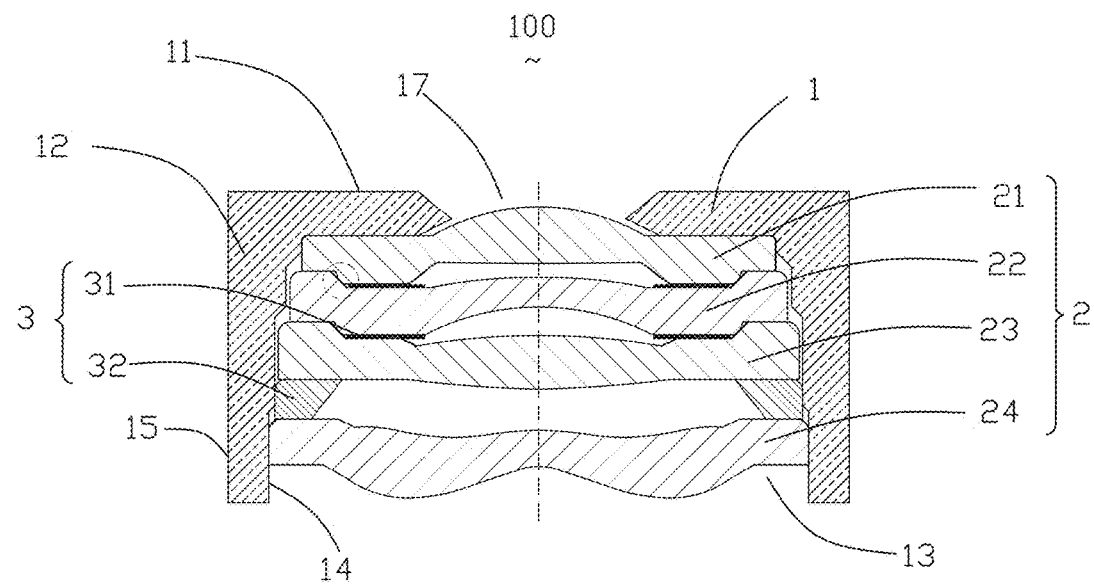
FIG. 1 is an illustration of a lens module in accordance with a first exemplary embodiment of the present disclosure.

The present invention will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain this disclosure, not intended to limit this disclosure.

Referring to FIGS. 1-5, a lens module 100, in accordance with a first exemplary embodiment of the present disclosure, comprises a lens barrel 1, a lens group 2 and a shade 3 accommodated in the lens barrel.

The lens barrel 1 comprises a first barrel wall 11 extending horizontally, a second barrel wall 12 extending from the first barrel wall 11, and an accommodation space 13 formed by the first barrel wall 11 and the second barrel wall 12. The lens barrel 1 further comprises an inner wall 14 and an outer wall 15 corresponding to the inner wall 14. The inner wall 14 is formed by an inner side of the first barrel wall 11 and an inner side of the second barrel wall 12 jointly; and the outer wall 15 is formed by an outer side of the first barrel wall 11 and an outer side of the second barrel wall 12 jointly. Moreover, the lens barrel 1 also comprises an optical aperture 17.

The lens group 2 comprises a first lens 21, a second lens 22, a third lens 23 and a fourth lens 24 which are stacked sequentially from an object side to an image side. Each of the lenses comprises an arc part 25 and a peripheral part 26 arranged at an edge of the arc part 25.

The first lens 21 comprises an upper surface 211 far from the first barrel wall 11 and a lower surface 212 opposite to the upper surface 211; the first lens 21 and the lens barrel 11 are fixed together by means of glue. Certainly, the first lens 21 can also be fixed by means of interference fit with the inner wall 14 of the lens barrel 1.

The second lens 22 comprises an upper surface 221 which is far from the first barrel wall 11 and a lower surface 222 opposite to the upper surface 221. The peripheral part 26 of the second lens 22 is positioned in the accommodation space 13 of the lens barrel 1 by using a matching structure 27 formed with the peripheral part 26 of the first lens 21. And the matching structure 27 comprises a first matching part 28 positioned on the peripheral part 26 of the first lens 21 and a second matching part 29 positioned on the peripheral part 26 of the second lens 22. The first matching part 28 is arranged on the lower surface 212 of the first lens 21; and the second matching part 29 is arranged on the upper surface 221 of the second lens 22.

Along the edge of the first lens 21 toward the direction of the optical axis, the first matching part 28 sequentially comprises a first plane 281 which extends horizontally, a first slope 282 which extends aslant toward the image side from the first plane 281, a second slope 283 which extends aslant toward the image side from the first slope 282 and a second plane 284 which extends horizontally from the second slope 283. Along the edge of the second lens 22 toward the direction of the optical axis, the second matching part 29 sequentially comprises a third plane 291 which is adhered to the first plane 281 at least partially, a third slope 292 which extends aslant toward the image side from the third plane 291, a fourth slope 293 which extends aslant toward the image side from the third slope 292 and a fourth plane 294 which extends horizontally from the fourth slope 293, wherein a hollow gap is formed between the first slope 282 and the third slope 292. The second slope 283 is adhered to the fourth slope 293 at least partially. The second plane 284 is arranged opposite to the fourth plane 294, wherein when the gradient of the first slope 282 on the first lens 21 is equal to that of the second slope 283. The gradient of the third slope 292 on the second lens 22 is not equal to that of the fourth slope 293; When the gradient of the third slope 292 on the second lens 22 is equal to that of the fourth slope 293, the gradient of the first slope 282 on the first lens 21 is not equal to that of the second slope 283. For example, the gradient of the third slope 292 on the second lens 22 is equal to that of the fourth slope 293 as show in FIG. 2. At this time, the gradient of the first slope 282 on the first lens 21 shall not be equal to that of the second slope 283.

Figure 2:
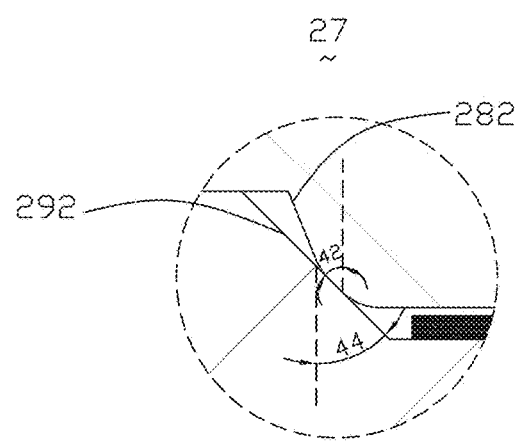
FIG. 2 is an enlarged view of the circled part in FIG. 1.
Figure 3:
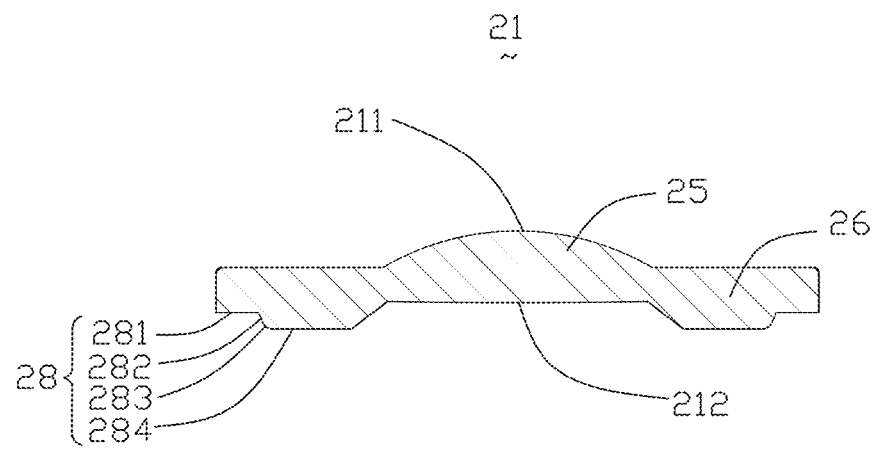
FIG. 3 is an illustration of a first lens of the lens module in FIG. 1.
Figure 4:
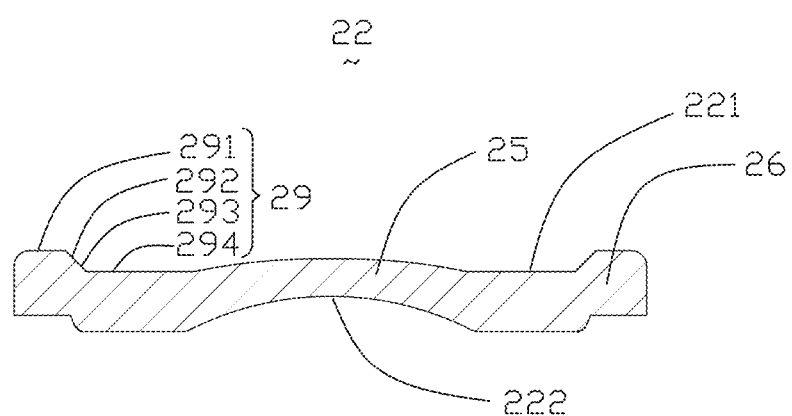
FIG. 4 is an illustration of a second lens of the lens module in FIG. 1.
Figure 5:
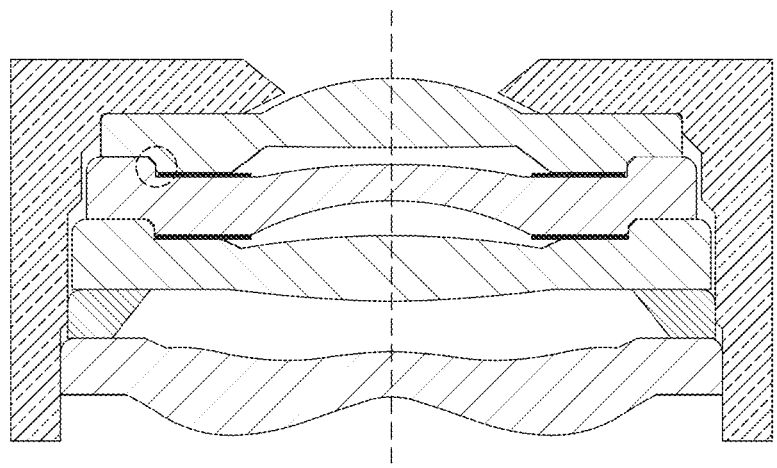
FIG. 5 is an illustration of a lens module in accordance with a second exemplary embodiment of the present disclosure.
Figure 6:
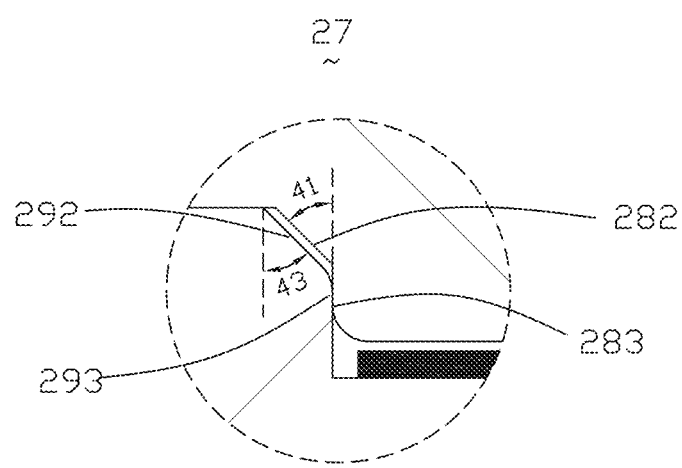
FIG. 6 is an enlarged view of the circled part in FIG. 5.

As shown in FIGS. 2 and 6, a first angle 41 is formed between the first slope 282 and the optical axis, and the first angle is configured to be less than 90°. A second angle 42 is formed between the second slope 283 and the optical axis, and the second angle 42 is less than 90°. A third angle 43 is formed between the third slope 292 and the optical axis, and the third angle is less than 90°. A fourth angle 44 is formed between the fourth slope 293 and the optical axis, and is less than 90°. As shown in FIG. 6, the second angle 42 formed between the second slope 283 and the optical axis and is 90°; and fourth angle 44 formed between the fourth slope 293 and the optical axis and is 90°; the first angle 41 formed between the first slope 282 and the optical axis and the third angle 43 formed between the third slope 292 and the optical axis are both less than 90°. The plane and the slope on the first lens 21 are connected by means of an arc surface; or two surfaces are connected in the form of right angle; the plane and the slope on the second lens 22 is connected by means of arc surface. The first slope 282 is connected with the second slope 283 by means of arc surface, and the second slope 283 is connected with the second plane 284 by means of arc surface in the embodiment 1, while other planes and slopes are connected directly in form of right angle. The second slope 283 is connected with the second plane 284 by means of arc surface, and the third slope 292 is connected with the fourth slope 293 by means of arc surface, while other planes and slopes are connected directly in form of right angle.

The first lens 21 can be subjected to interference fit with the inner wall 14 of the lens barrel 1, or stress-free fit with the inner wall 14; the second lens 22, the third lens 23 and the inner wall 14 of the lens barrel 1 are arranged spaced from each other, wherein the upper surface 221 of the second lens 22 is positioned in the lens barrel 1 by using the matching structure 27 formed between the upper surface 221 of the second lens 22 and the lower surface 212 of the first lens 21. The upper surface of the third lens 23 is positioned in the lens barrel 1 by using the matching structure 27 formed between the upper surface of the third lens 23 and the lower surface 222 of the second lens 22. The fourth lens 27 and the inner wall 14 of the lens barrel 1 are fixed by means of glue after being subjected to interference fit or stress-free fit. Therefore the first lens 21, the second lens 22, the third lens 23 and the fourth lens 24 are fixed in the accommodation space 13 of the lens barrel 1. Or, the upper surface of the fourth lens 24 can be positioned in the lens barrel 1 by using the matching structure 27 formed between the upper surface of the fourth lens and lower surface of the third lens 23. In this way, the fourth lens 24 and the inner wall 14 of the lens barrel 1 can be arranged with interval; finally, the whole lens module 100 can be stabilized after fixing a stopper under the fourth lens 24. Moreover, the quantity of the lenses is not limited in this present disclosure; and the lenses can be positioned by arranging the matching structures 27 among any two adjacent lenses.

A shading part 3 comprises a shade 31 and a shading plate 32, wherein a thickness of the shade 31 shall be less than that of the shading plate 32; and the shade 31 or shading plate 32 shall be arranged among different lenses in accordance with the actual need. The shades 31 are arranged between the first lens 21 and the second lens 22, and between the second lens 22 and the third lens 23; the shades 31 are held between the second plane 284 of the first lens 21 and the fourth plane 294 of the second lens 22. The shading plate 32 is arranged between the third lens 23 and the fourth lens 24. The shade 31 can absorb the stray lights. While the shading plate 32 has the effect of shielding lights, and the light reflected by the shading plate 32 can also be absorbed by the shade 31. Moreover, the shade 31 can be the shade after stamping; and the shading plate 32 can be the plastic/metal shading plate.

Compared with relevant technologies, the lens module 100 of the present disclosure has following beneficial effects: the high concentricity can be kept among all lenses by means of the matching structure in the present disclosure; at the same time, the lens cannot be deformed and the precision and stability during installing the lens can be ensured because the middle lenses are not required to match with the inner wall of the lens barrel in the way of extrusion.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module having an optical axis, comprising:
a lens barrel;
a lens group accommodated in the lens barrel, the lens group comprising a first lens and a second lens, each of the first lens and the second lens including an arc part and a peripheral part around the arc part;
a matching structure formed by the peripheral part of the second lens and the peripheral part of the first lens, the matching structure including:
a first matching part formed on the peripheral part of the first lens, the first matching part including sequentially a first plane extending horizontally, a first slope extending aslant toward an image side from the first plane, a second slope extending aslant toward the image side from the first slope, and a second plane extending horizontally from the second slope;
a second matching part formed on the peripheral part of the second lens, the second matching part sequentially including a third plane attached to the first plane, a third slope extending aslant toward the image side from the third plane, a fourth slope extending aslant toward the image side from the third slope, and a fourth plane extending horizontally from the fourth slope; wherein
a hollow gap is formed between the first slope and the third slope; the second slope is attached to the fourth slope; and the second plane is arranged opposite to the fourth plane.

2. The lens module as described in claim 1, wherein the lens barrel comprises an inner wall and an outer wall opposite to the inner wall; and the second lens is arranged separated from the inner wall of the lens barrel.

3. The lens module as described in claim 2, wherein when the gradient of the third slope on the second lens is equal to that of the fourth slope, the gradient of the first slope on the first lens is not equal to that of the second slope.

4. The lens module as described in claim 2, wherein the gradient of the third slope on the second lens is not equal to that of the fourth slope when the gradient of the first slope on the first lens is equal to that of the second slope.

5. The lens module as described in claim 4, wherein a first angle is formed between the first slope and the optical axis, and the first angle is less than 90°.

6. The lens module as described in claim 4, wherein a second angle is formed between the second slope and the optical axis, and the second angle is less than 90°.

7. The lens module as described in claim 4, wherein a third angle is formed between the third slope and the optical axis, and the third angle is less than 90°.

8. The lens module as described in claim 4, wherein a fourth angle is formed between the fourth slope and the optical axis, and the fourth angle is less than 90°.

9. The lens module as described in claim 1 further comprising a shade which located between the second plane of the first lens and the fourth plane of the second lens.

10. The lens module as described in claim 1, wherein the lens group further comprises at least a third lens arranged under the second lens; and the lens module further comprises the matching structure between the second lens and the adjacent third lens for positioning the third lens in the lens barrel.

* * * * *